Sept. 8, 1925.
A. S. ROCKETT
PUNCTUREPROOF WHEEL
Filed June 14, 1924
1,553,267
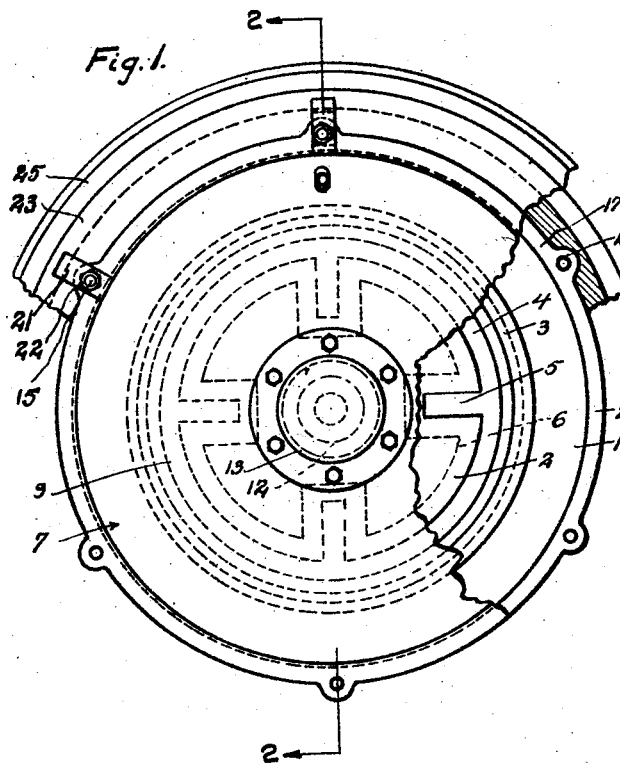
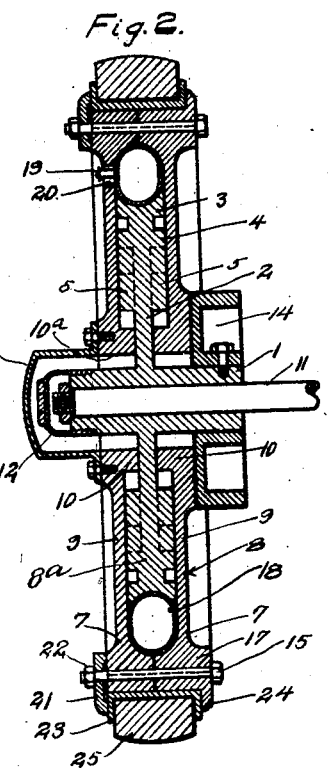
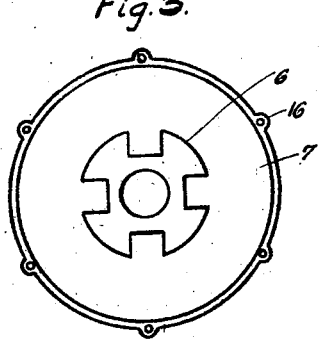
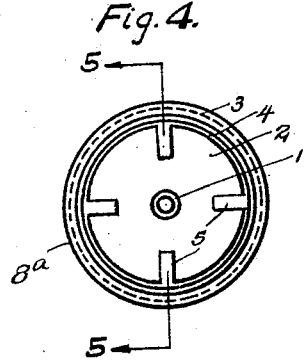
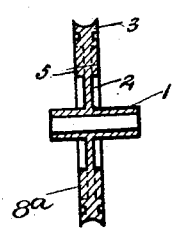
A. S. ROCKETT, INVENTOR
BY Victor J. Evans
ATTORNEY Patented Sept. 8, 1925.

1,553,267

UNITED STATES PATENT OFFICE.

ADAM S. ROCKETT, OF PITTSBURGH, PENNSYLVANIA.

PUNCTUREPROOF WHEEL.

Application filed June 14, 1924. Serial No. 720,048.

*To all whom it may concern:*

Be it known that I, ADAM S. ROCKETT, a citizen of the United States, residing at Pittsburgh, in the county of Allegheny and State of Pennsylvania, have invented new and useful Improvements in Punctureproof Wheels, of which the following is a specification.

This invention relates to puncture-proof wheels, and more particularly to a wheel of this character specially adapted for use in connection with automobiles.

One of the main objects of the invention is to provide a puncture-proof wheel of simple construction and operation which possesses maximum resiliency and may be readily produced at relatively small cost. A further object is to provide a wheel of this character which possesses great resiliency and may be readily assembled or disassembled. Further objects will appear from the detail description.

In the drawings:—

Fig. 1 is a side view, partly broken away, of the wheel;

Fig. 2 is a section taken substantially on line 2—2 of Fig. 1;

Fig. 3 is an inner face view of one of the sections of the outer member of the wheel;

Fig. 4 is a side view of the inner member of the wheel;

Fig. 5 is a section taken substantially on line 5—5 of Fig. 4.

The wheel includes an inner member $8^a$ formed with a central hub 1 from which extends a disc 2 having its outer portion thickened to form a rim 3 the outer face of which is concaved in cross-section. Disc 2 is further provided, on each side, with an annular shoulder 4 disposed concentric with rim 3 and with a plurality of lugs 5 which extend inwardly radially of the disc from shoulder 4. These lugs extend between the arms of cruciform projections 6 extending inwardly from the inner faces of sections 7 of an outer member 8 within which the inner member is positioned. Each section 7 of this outer member includes a disc 9 provided with a central hub portion 10. The aligned openings of hub portions 10 are of greater diameter than hub 1 of member $8^a$ so as to permit movement of the inner member relative to member 8. An axle 11 is secured through hub 1 in a known manner and a hub cap 12 is secured over the outer end of the hub. A closure cap 13 is secured to hub portion 10 of outer section 7 of member 8, the peripheral wall of this cap being disposed in alignment with opening $10^a$ of member 8 to permit relative movement of hub 1. A drum 14, which may be used as a brake drum, is secured to hub 1 and serves to close the inner end of opening $10^a$ while permitting movement of hub 1, cap 13 and drum 14 thus effectually preventing entry of grit and other foreign materials into the wheel structure. Drum 14 is also adapted to be used as a brake drum where this is practical. As will be obvious, drum 14, where desired, may be replaced by a closure plate for covering the inner end of opening $10^a$.

Sections 7 of member 8 are secured together by bolts 15 which pass through lugs 16 formed integrally with the outer thickened portions 17 of members 7. These portions 17 form an outer rim the inner face of which is concaved, this outer rim and the rim 3 of inner member $8^a$ receiving between them an inflated elastic casing or tube 18 of rubber or other suitable material which, if desired, may be provided with an inflating valve 19 extending through an opening 20 provided in one of the sections 7 of member 8. Due to the relative movement between members 2 and 8, the tube or casing 18, when inflated, acts in the same manner as a pneumatic tire to absorb shocks thus providing a wheel of maximum resiliency. When axle 11 is rotated this rotation is transmitted to outer member 8 by means of members 6 and lugs 5 and relative movement between members 8 and 2 is permitted due to the fact that the lugs 5 are of less width than the spaces between the arms of members 6 and are normally spaced away from the inner ends of these arms.

Nuts 22 are threaded onto the bolts 15 and act to force securing clips 21 mounted on these bolts into tight contact with the lateral flange of a rim 23 of channel cross-section which is mounted on the outer face of the rim formed of thickened portions 17 of member 8. Movement of channel rim 23 away from clips 22 is positively limited by a flange 24 provided at the outer portion of one section 7 of member 8. A solid tire 25 formed of rubber or any other suitable or preferred material is carried by rim 23 thus providing a tread surface for the wheel. This provides a wheel of simple construction and operation which may be produced and assembled at relatively small cost and which possesses maximum resiliency and great strength. As the cushion member formed of the casing or tube 18 is completely enclosed by members 2 and 8, this cushion member is not at any time exposed to pointed or sharp objects on the road surface and is effectually protected by the enclosing casing provided by the inner and outer members 8ª and 8, thus producing a wheel which is absolutely puncture-proof.

What I claim is:—

In a wheel of the character described, an inner member including a hub and a disc extending from the hub and provided with an outer rim portion, an outer member formed in two sections disposed at opposite sides of and enclosing the inner member, said outer member being provided with an outer rim portion and with an opening receiving and of greater diameter than the hub of the inner member, each section of the outer member being provided on its inner face with a cruciform projection adjacent to the opening through said outer member, the inner member being provided on its lateral faces with lugs extending between the arms of said projection, said lugs being of less width than the spaces between the arms of the projections and being normally positioned outwardly of the inner end walls of said spaces to permit relative movement between the inner member and the outer member, means for securing the sections of the outer member together, and a pneumatic cushion member confined between the rim portion of the outer member and the rim of the inner member.

In testimony whereof I affix my signature.

ADAM S. ROCKETT.